United States Patent [19]

Martin

[11] 4,159,696

[45] Jul. 3, 1979

[54] EGG COLLECTOR

[75] Inventor: Harlan W. Martin, New Holland, Pa.

[73] Assignee: Favorite Manufacturing, Inc., New Holland, Pa.

[21] Appl. No.: 868,222

[22] Filed: Jan. 9, 1978

[51] Int. Cl.² .................... A01K 31/14; B65G 47/08
[52] U.S. Cl. ................................. 119/48; 198/652; 198/796
[58] Field of Search ................ 119/48; 198/482, 652, 198/796, 801; 209/914

[56] References Cited

U.S. PATENT DOCUMENTS

| | | | |
|---|---|---|---|
| Re. 25,706 | 12/1964 | Peterson | 198/131 |
| 2,710,682 | 6/1955 | Coll | 119/48 X |
| 2,745,379 | 5/1956 | Schmidt | 119/48 |
| 2,987,038 | 6/1961 | Cole | 119/48 X |
| 3,157,271 | 11/1964 | Peterson | 198/131 |
| 3,185,289 | 5/1965 | Kurtz et al. | 198/232 |
| 3,524,529 | 8/1970 | Voran et al. | 198/22 |
| 3,626,905 | 12/1971 | Giesbert et al. | 119/48 |
| 3,672,485 | 6/1972 | Walters | 119/48 X |

*Primary Examiner*—Hugh R. Chamblee
*Attorney, Agent, or Firm*—Stanley B. Kita

[57] ABSTRACT

An egg collector for use in conjunction with a multi-tier poultry cage system to collect eggs from cage belts at various levels and to transfer the eggs to a common cross-belt conveyor. The collector comprises a series of intermediate conveyors each including an endless belt having a series of individual egg-receiving cups disposed in longitudinally spaced relation along the belt. Transfer means located alongside each belt gathers the eggs from each cage conveyor belt and delivers them individually to successive egg-receiving cups of each intermediate conveyor. The eggs are conveyed downwardly by the intermediate conveyors to a location adjacent the cross belt where means is provided to control unloading of the eggs from the cups.

11 Claims, 19 Drawing Figures

EGG COLLECTOR

FIELD OF THE INVENTION

This invention relates to new and useful improvements in apparatus for collecting eggs from a plurality of multi-level cages.

BACKGROUND OF THE INVENTION

At the present time, poultry maintained for egg production purposes are confined in a plurality of cages disposed in laterally adjacent relation in a plurality of rows of cages arranged in multi-level tiers. The eggs laid by poultry confined in the cages roll out of the cages and onto a conveyor belt extending along the front of each row or tier of cages. The eggs are conveyed on the belt to collector apparatus at one end of the rows. There the eggs are gathered from the cage conveyor belt and transferred to a common cross belt conveyor which functions to transfer the eggs to a central processing station where the eggs are cleaned, graded and packed for shipment. Egg collector apparatus available prior to the present invention has been relatively complicated and expensive to manufacture.

SUMMARY OF THE INVENTION

With the foregoing in mind, a primary object of the present invention is to provide a novel egg collector which is of relatively simple construction and which is inexpensive to manufacture and maintain. In brief, the collector comprises a novel arrangement of intermediate conveyors onto which the eggs are transferred from the cage conveyor belts. Each intermediate conveyor comprises an endless belt that carries a series of individual egg receiving cups, and novel means is provided for effecting transfer of the eggs from each cage conveyor belt into the individual cups of each intermediate conveyor without damage to the eggs. The eggs are conveyed by the intermediate conveyor arrangement to a location adjacent a common transfer conveyor, and novel means is provided for transferring the eggs from the individual cups of the intermediate conveyor arrangement to the common transfer conveyor without damage to the eggs.

BRIEF DESCRIPTION OF THE DRAWINGS

The foregoing and other objectives of the invention and the various novel features and details of construction thereof are hereinafter set forth and described with reference to the accompanying drawings, in which.

DESCRIPTION OF THE PREFERRED EMBODIMENT

Referring to the drawings, the egg collector designated generally as C of the present invention is shown in a form constructed for use in conjunction with a cage arrangement comprising four tiers of vertically spaced and horizontally offset rows of poultry confinement cages each having a horizontal conveyor belt disposed along the fronts of the cages to receive eggs laid by poultry confined in the cages and to convey the eggs to the egg collector C.

In the illustrated embodiment of the invention, the cage conveyors associated with the tiers or rows of cages are designated 1, 1(a), 1(b) and 1(c), respectively. The construction and arrangement of each of the four cage conveyors 1, 1(a), 1(b), and 1(c) is identical. Therefore a description of the conveyor 1 will suffice, the corresponding parts of the other cage conveyors being designated by the same reference numbers and the letters (a), (b), or (c) as the case may be.

Each cage conveyor comprises a horizontally extending endless belt 1 fabricated of polypropylene or jute and having its upper course disposed to receive thereon eggs as they are discharged from the associated tier or row of confinement cages. Between the ends of the cages and the collector C, the upper course of the belt 1 travels in a supporting trough or channel 2 having a bottom 3 on which the belt 1 rides and vertically extending side walls 4a and 4b that retain the eggs on the belt.

The egg collector C comprises a frame structure including a pair of vertical corner posts 5 and 6, an intermediate vertical strut 7, short vertical legs 8 and 9, inclined posts 10 and 11, top cross supports 12 and 13 and various internal struts secured together in the illustrated relationship by conventional means such as welding to provide a rigid upstanding framework. A plurality of supporting members 20, 20(a) and 20(b) each comprising a vertical plate portion 21 and a horizontal portion 22 are mounted internally of the collector frame inwardly adjacent the inclined posts 10 and 11. These supporting structures 20, 20(a) and 20(b) are secured to the collector frame in a conventional manner, as by welding.

Figure 1:
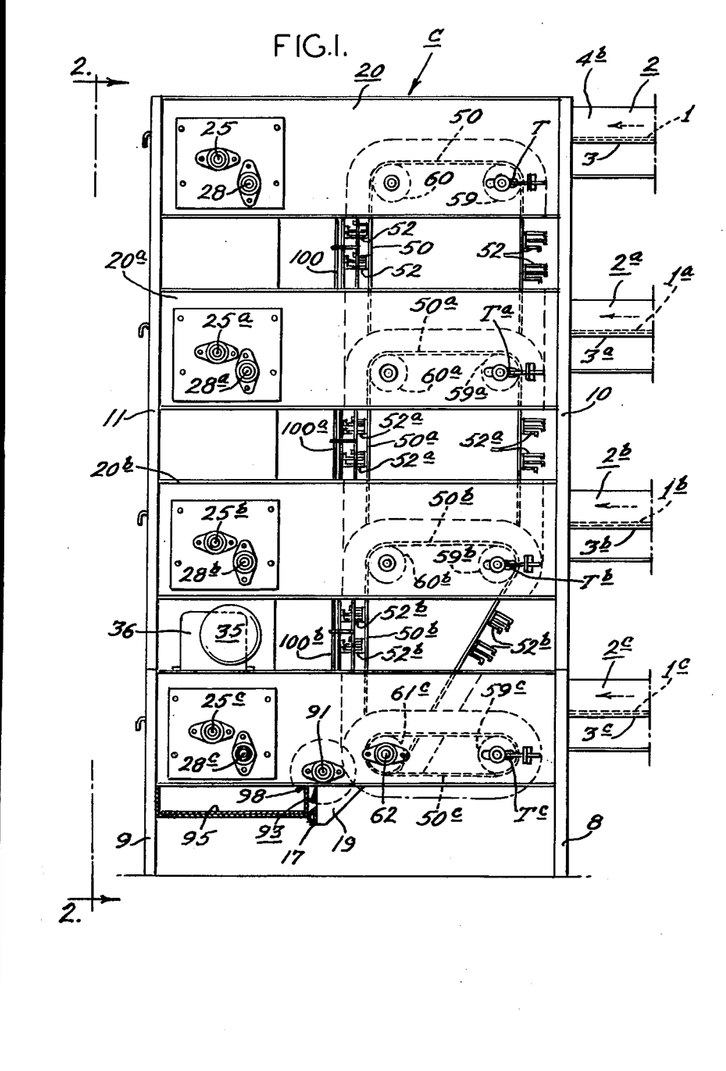
FIG. 1 is a side elevational view of an egg collector embodying the present invention.
Figure 2:
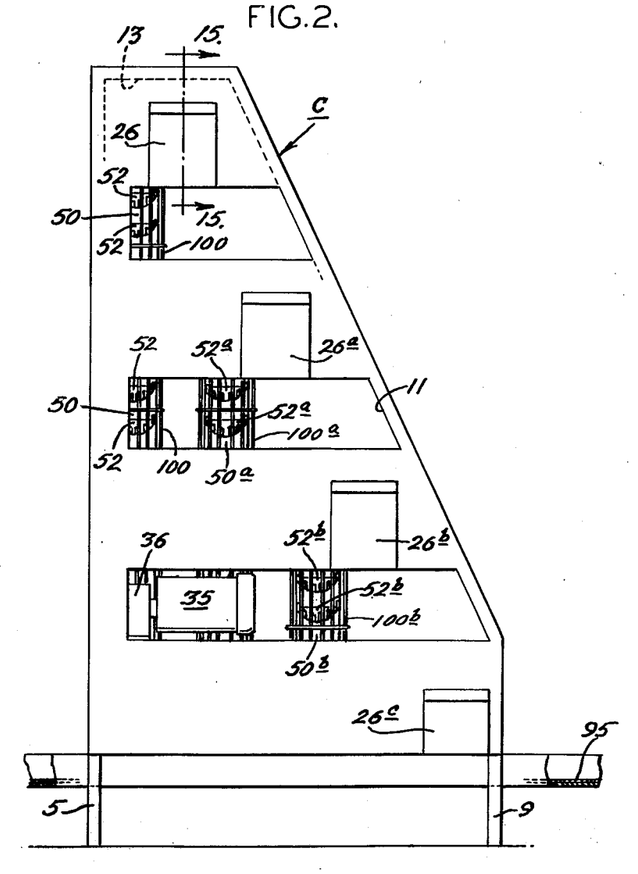
FIG. 2 is an elevational view of the front end of the collector from line 2—2 FIG. 1.
Figure 3:
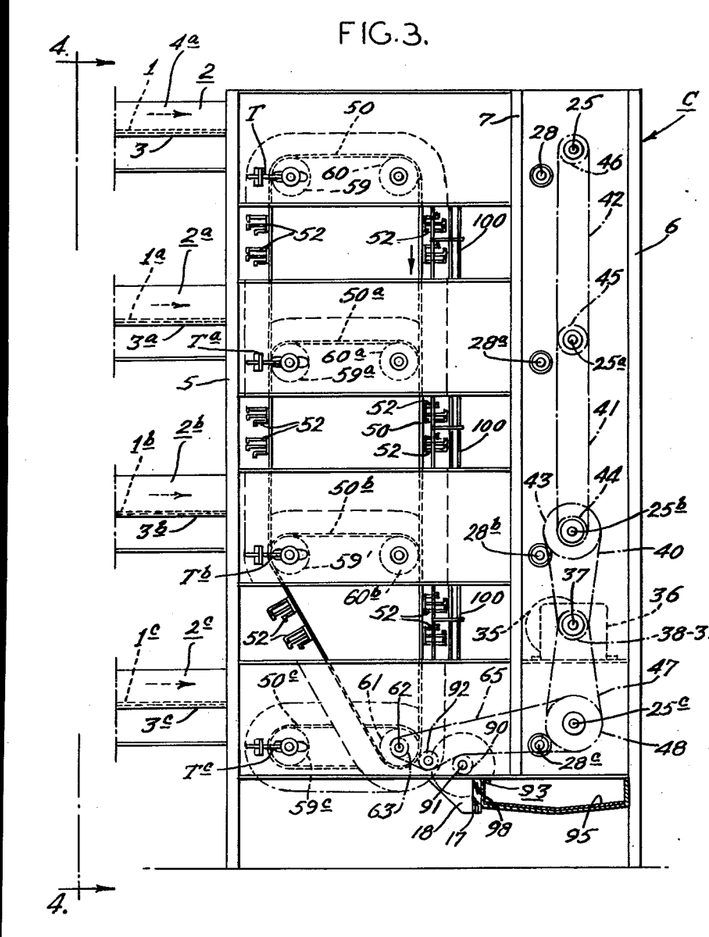
FIG. 3 is an elevational view of the opposite side of the collector shown in FIG. 1.
Figure 4:
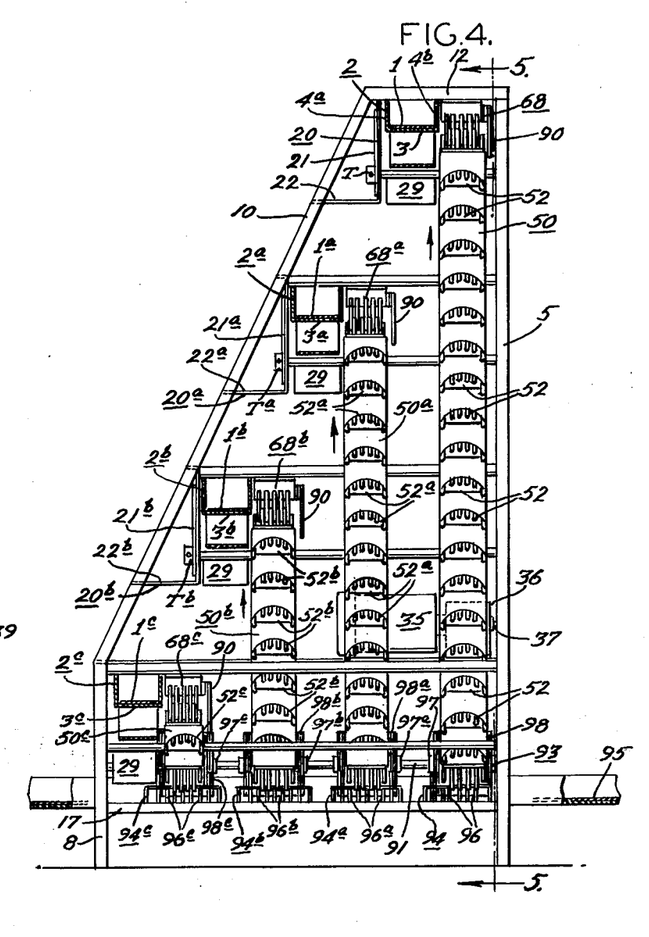
FIG. 4 is an elevational view of the back end of the collector from line 4—4, FIG. 3.
Figure 5:
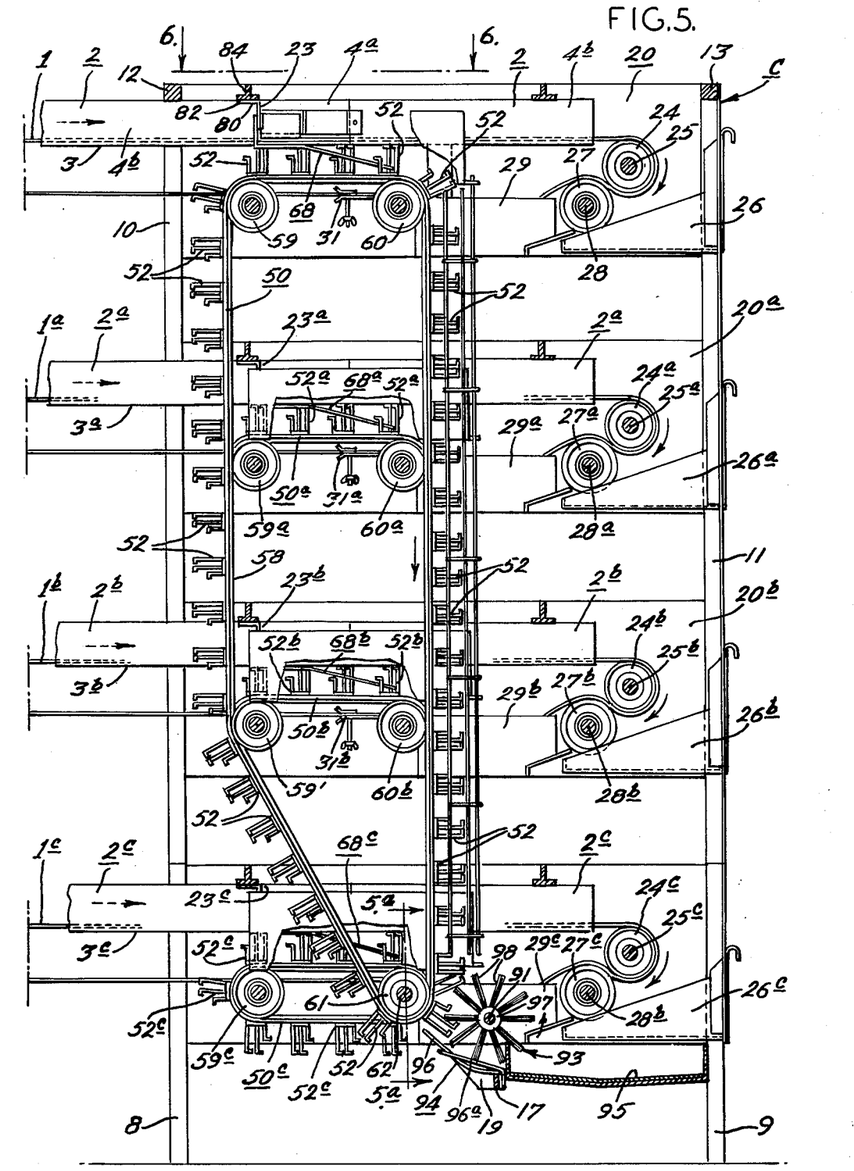
FIG. 5 is an enlarged sectional view on line 5—5 of FIG. 4.
Figure 6:
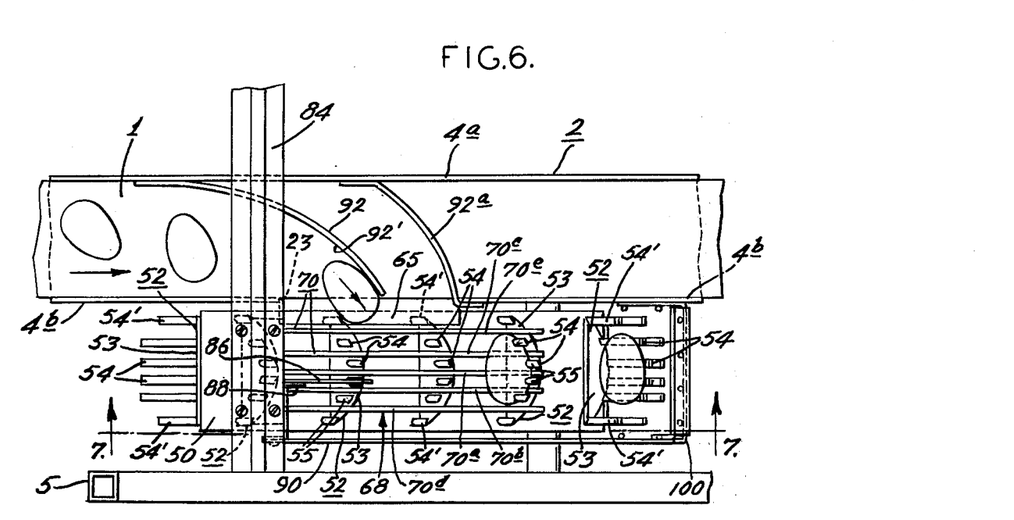
FIG. 6 is an enlarged fragmentary plan view on line 6—6 of FIG. 5.
Figure 15:
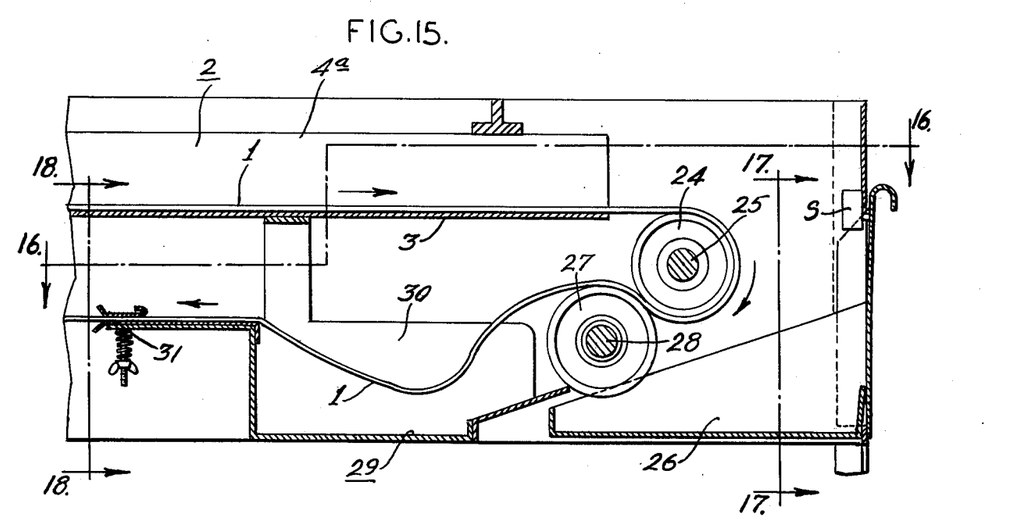
FIG. 15 is an enlarged fragmentary view, partially in section, on line 15—15, FIG. 2.
Figure 16:
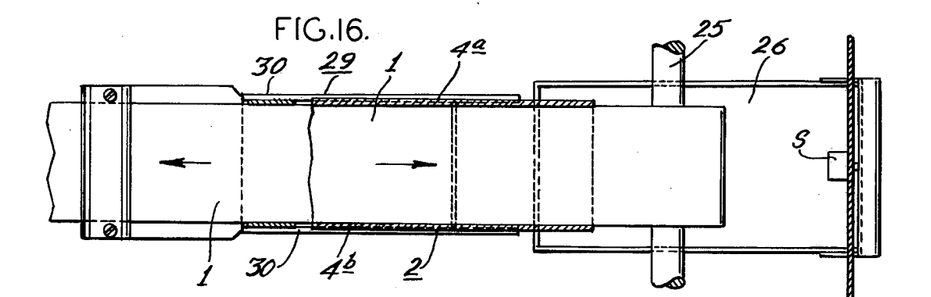
FIG. 16 is a view on line 16—16, FIG. 15.
Figure 17:
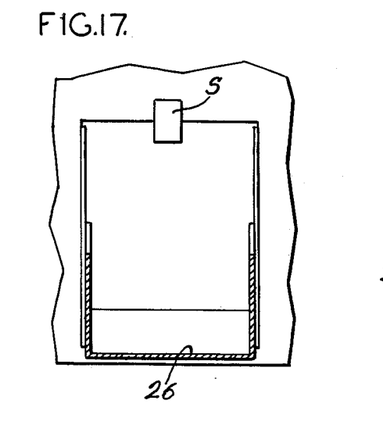
FIG. 17 is a fragmentary sectional view on line 17—17, FIG. 15.
Figure 18:
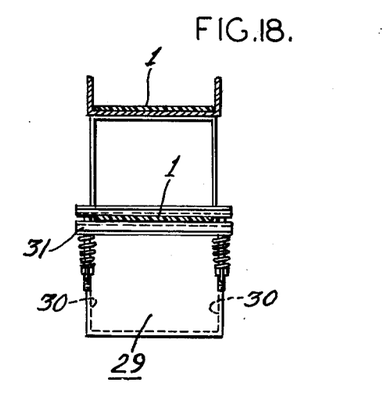
FIG. 18 is a fragmentary sectional view on line 18—18, FIG. 15.

The upper course of the cage conveyor belt 1 enters the egg collector C in the direction shown by the arrows in FIGS. 1, 3 and 5 of the drawings, and is supported therein by the channel or trough 2. As shown in FIG. 6, the eggs are discharged from the belt 1, through a gate opening or gap 23 provided in the side wall 4b of the conveyor supporting channel 2. After the eggs are discharged from the conveyor belt 1, the latter travels a short distance before exiting from its supporting channel 2. As shown in FIG. 5, the belt 1 then passes downwardly between a drive roll 24 and an idler roll 27 mounted on shafts 25 and 28, respectively. The drive roll 24 is rotated in the direction of the arrow shown in FIG. 5 to draw the belt conveyor 1 through its upper course of travel at a predetermined speed. As the belt 1 passes about the drive roll 24 any refuse collected on the belt 1 falls into a removable drawer 26. In the present instance, the drawer 26 pivots counterclockwise (FIG. 15) about its lower front edge against a normally-open switch S which functions to cut off power to the drive roll 24 when the drawer 26 is removed.

As best seen in FIGS. 15-18, after leaving the idler roll 27, the belt 1 traverses a lower course in the opposite direction from the upper course of travel thereof, first passing through a belt slack tray 29 and then through a belt tensioning device 31. The slack in the belt 1 between the idler roll 27 and the tension device 31 is gathered in the tray 29 between the side walls 30 thereof. After passing through the tension device 31, the belt 1 continues its lower course and returns to the opposite end of the associated tier or row of poultry cages where it passes about an idler roll (not shown) and again traverses the upper course to receive eggs from the associated poultry cages.

Referring now to FIG. 3, each of the drive rolls 24, 24(a), 24(b) and 24(c) of the respective cage belt conveyors 1, 1(a), 1(b) and 1(c) respectively, is driven at the same predetermined constant speed from a single motor 35 through a gear box 36 having an external drive shaft 37 on which are mounted drive sprockets 38 and 39. The drive rolls 24, 24(a) and 24(b) are driven by the sprocket 38 through a series of chains 40, 41 and 42 and sprockets 43, 44, 45 and 46 mounted on the shafts 25(b), 25(a) and 25 of the respective drive rolls 24(b), 24(a) and 24. The drive roll 24(c) for the lowermost belt conveyor 1(c) is driven by the gear box sprocket 39 through a chain 47 and a sprocket 48 on the shaft 24(c) of said roll 24(c).

Associated with each of the cage belt conveyors 1, 1(a), 1(b) and 1(c) is an intermediate conveyor generally designated 50, 50(a), 50(b) and 50(c) respectively, and a particular feature of the present invention resides in the construction and arrangement of these intermediate conveyors and the means associated therewith for effecting proper transfer of the eggs from the cage belt conveyors to the intermediate conveyors. Although the intermediate conveyors are of different lengths, their construction and operation is the same. Therefore a description of only the intermediate conveyor 50 is necessary to enable one skilled in the art to understand the invention.

Figures 10, 11:
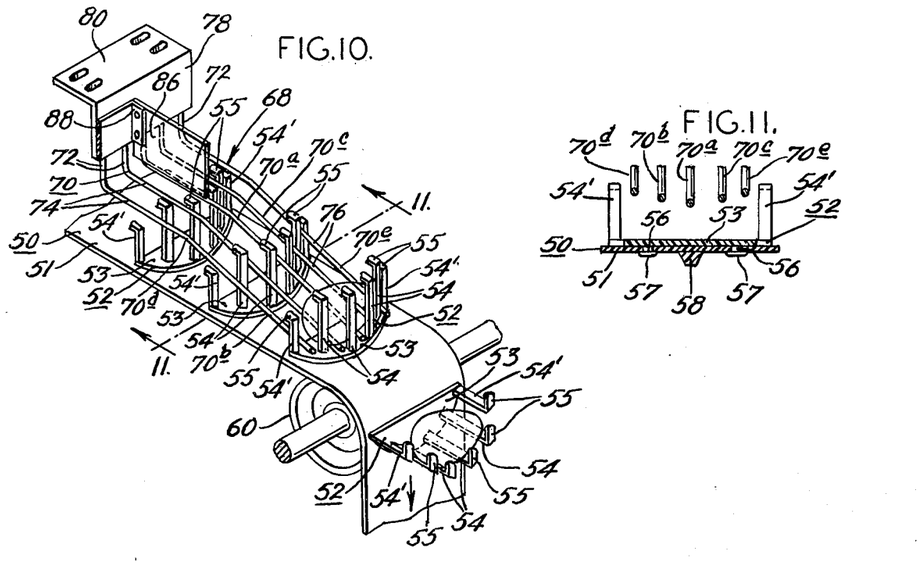
FIG. 10 is an enlarged fragmentary perspective view showing a portion of the intermediate conveyor and the associated transfer ramp by which the eggs from the cage conveyor are delivered into the individual egg cups of the intermediate conveyor.
FIG. 11 is an enlarged sectional view on line 11—11, FIG. 10.
Figure 12:
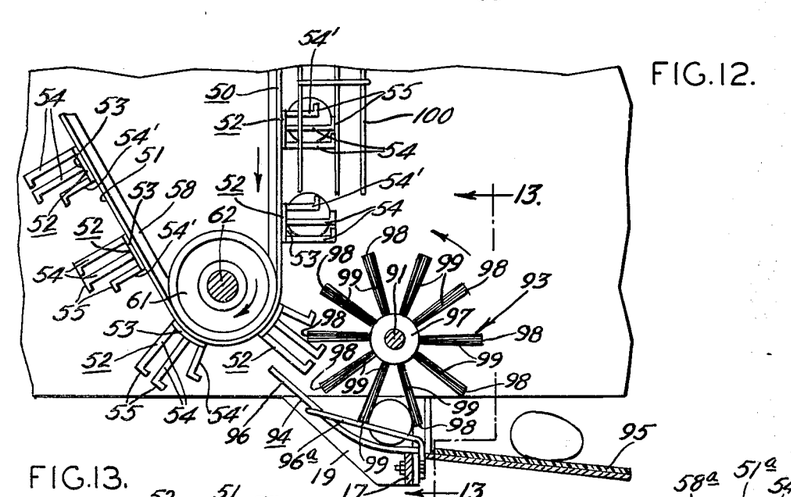
FIG. 12 is an enlarged fragmentary view of a lower portion of FIG. 5, partially in section, showing the mechanism for transferring the eggs from the cups of the intermediate conveyor to the common transfer conveyor.
Figure 13:
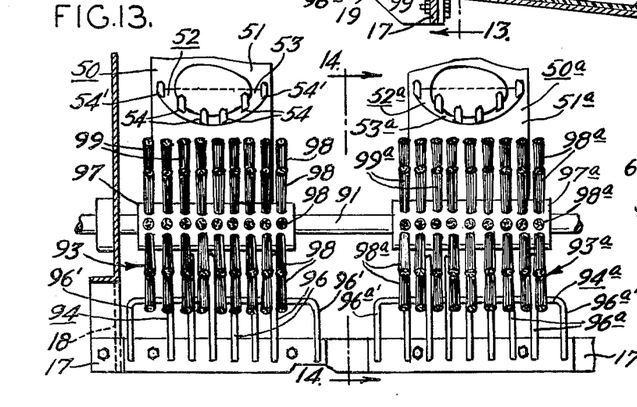
FIG. 13 is a fragmentary view on line 13—13, FIG. 12.
Figure 14:
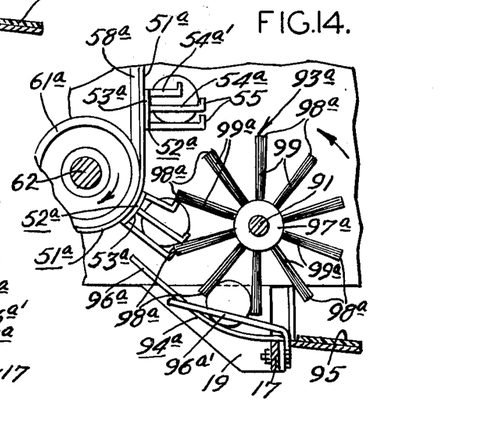
FIG. 14 is a view, partially in section, on line 14—14, FIG. 13.

Referring more particularly to FIGS. 6-11 of the drawings, the intermediate conveyor 50 comprises an endless belt assembly including a web 51 preferably fabricated of synthetic material, such as polyester and provided with an outer or top surface of polyvinyl chloride. Secured to the top side of the belt web 51 is a series of individual egg cups 52 mounted transversely of the belt surface in predetermined equally spaced relation longitudinally throughout the length of the belt. Preferably each of the egg cups 52 is of molded plastic material, such as nylon, and comprises a base portion 53 and a plurality of integral fingers 54 projecting perpendicularly therefrom. The outer end portion 55 of each finger 54 extends at right angles to the finger in the direction opposite the direction of travel of the belt 50. The fingers 54 are disposed in spaced apart relation transversely of the belt 51 in a concave arcuate arrangement forming a cup to receive and retain an egg therein such as illustrated in FIG. 10 of the drawings. The fingers 54' and 54' at the opposite sides of the cup are of shorter length than the intermediate fingers to afford proper egg loading in the manner to be described. Preferably, the egg cups 52 are secured to the belt 51 by means of lugs 56 formed integrally with the underside of the cup base portion 53 and extending through openings in the belt web 51 with their extremities flattened by the application of heat and pressure to provide retaining head portions 57 as shown in FIG. 11 of the drawings.

In order to advance the conveyor 50, a continuous V-belt member 58 fabricated, for example, of molded neoprene is bonded to the under or inner surface of the belt 51 centrally therealong. The endless belt 51 of the intermediate conveyor 50 is mounted to travel about a pair of horizontally spaced upper idler pulleys or sheaves 59 and 60 respectively and a lower drive pulley 61, and certain other idler pulleys to be described. The pulleys 59, 60 and 61 are of similar construction, and as shown in FIG. 8, each comprises a central V-pulley 62 for receiving the V-belt 58 of the conveyor belt 51 and a pair of pulley disks 63 and 64 spaced laterally adjacent the V-pulley 62 to support the lateral edge portions of the conveyor belt 51.

Figure 7:
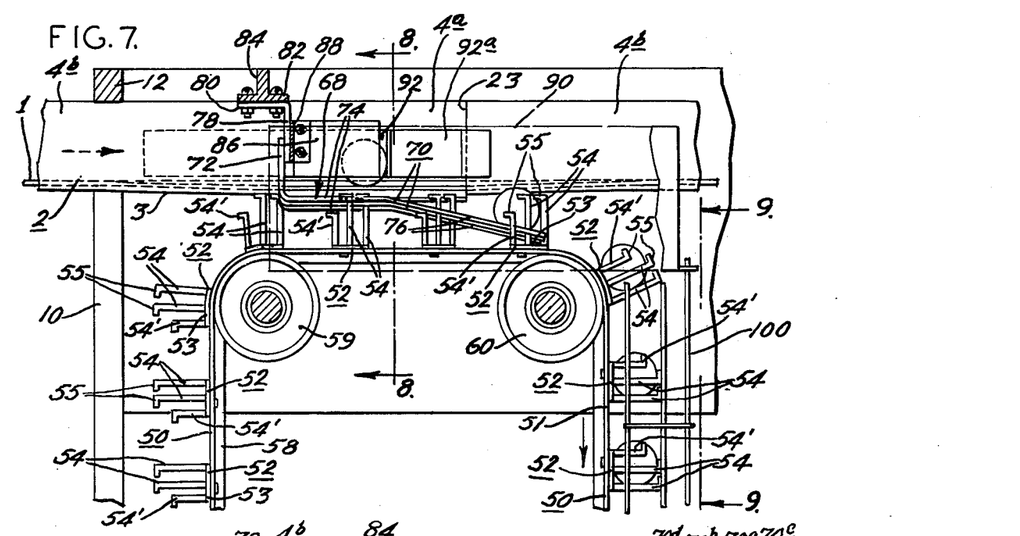
FIG. 7 is a fragmentary sectional view on line 7—7 of FIG. 6.
Figure 8:
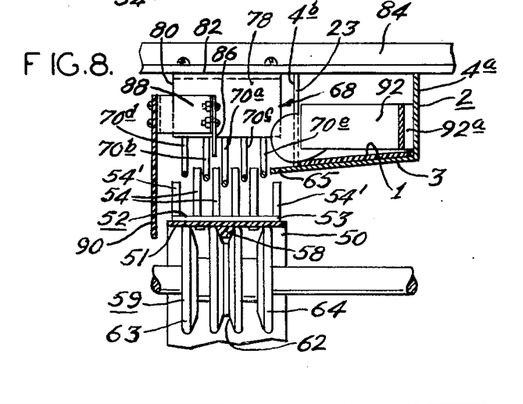
FIG. 8 is a sectional view on line 8—8, FIG. 7.
Figure 9:
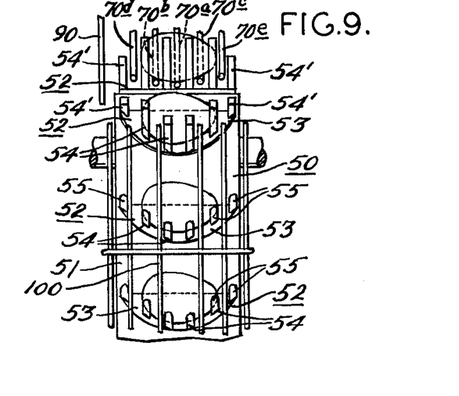
FIG. 9 is a fragmentary view on line 9—9, FIG. 7.

As shown in FIGS. 6-8 of the drawings, the idler pulleys 59 and 60 for the intermediate conveyor 50 are mounted so that the conveyor travels from the pulley 59 to pulley 60 in a horizontal path located inwardly adjacent and below the gate or opening 23 in the side wall 4b of the channel 2 through which eggs are discharged from the belt conveyor 1. As the intermediate conveyor 50 traverses the horizontal course between the idler pulleys 59 and 60, the fingers 54 of the egg cups 52 extend vertically upward as shown in FIG. 7, and the endmost fingers 54' adjacent the associated belt conveyor 1 pass closely under a Teflon-coated lateral cantilever extension 65 of the trough bottom 3 in the zone of the gap 23. Thus, the extension 65 cooperates with the cup fingers 54 to insure proper loading of the eggs into the egg cups 52. Preferably, the trough bottom 3 and extension 65 are inclined downwardly in the zone of the gap 23 to induce egg rolling toward the advancing cups.

For the purpose of loading eggs into the advancing cups 52, an egg transfer ramp assembly 68 is mounted inwardly adjacent the egg discharge opening 23 in the channel wall 4b of the cage conveyor 1 to overlie the belt 51 of the intermediate conveyor 50. Referring particularly to FIGS. 7, 8 and 10 of the drawings, the egg transfer assembly ramp 68 comprises a plurality of spaced parallel tines 70 which extend longitudinally in the direction of travel of the intermediate conveyor 50 and which are spaced apart with respect to each other and the fingers 54 of the egg cups 52 so as to interdigitate with the cup fingers 54 as they pass between the tines 70 as shown in FIG. 10 of the drawings.

Each of the tines 70 of the egg transfer ramp 68 includes a vertical leg portion 72, a horizontally extending mid-portion 74 and a declining or sloping end portion 76 which terminates superadjacent the sheave or pulley 60. The vertical leg portions 72 of the tines 70 are secured, for example, by welding, to the depending flange portion 78 of a bracket 80 which is fixedly mounted at 82 to a fixed member 84 of the frame construction of the egg collector C.

As best seen in FIGS. 10 and 11, the central or median tine 70a terminates closely adjacent the topside of the belt 51. The tines 70b and 70c immediately adjacent and outboard of the central tine 70a, and the outermost tines 70d and 70e are all disposed at progressively higher levels in parallel relation to provide an elongated trough-like assembly which cooperates to confine downwardly-moving eggs in its center for depositing them centrally in the advancing cups 52. Preferably, the tines 70 and bracket 80 are fabricated of metal and are coated with a resilient plastic material such as combination of nylon and vinyl resin.

In order to insure loading of the eggs one at a time in the cups 52, cooperating means are provided in the zone of the trough opening 23. To this end, deflector means extends longitudinally above the tines 70 in laterally spaced parallel relation with respect to the discharge gap or opening 23 in the belt conveyor trough 2. In the illustrated embodiment, the deflector means includes a vertical guide plate 86 secured to a bracket 88 which is mounted on the flange portion 78 of the bracket 80. Preferably the guide plate 86 is fabricated of thin nylon material so as to be resiliently-deflectable in the lateral direction. To prevent lateral overtravel of the eggs, a vertical plate 90 is disposed longitudinally and vertically adjacent the intermediate conveyor 50 alongside the transfer ramp 68 on the side thereof opposite the belt conveyor 1. Preferably, the plate 90 is fabricated of nylon so as to provide a smooth yet somewhat resilient surface.

For the purpose of displacing eggs on the cage belt conveyor 1 laterally through the gap 23 in the trough wall 4b, an arcuate wiper blade 92 extends across the upper surface of the belt 1 in the vicinity of the gap 23. The wiper blade 92 is preferably fabricated of stainless steel and is coated on its upstream surface with a layer of Teflon tape 92'. The wiper blade 92 is of relatively thin gauge metal and has its upstream end fixedly mounted to the inside of the trough wall 4a upstream of the gap 23. The other or free end of the wiper blade 92 is normally disposed at about the midpoint of the opening 23 which has a lengthwise dimension of about 6 inches. The wiper blade 92 is designed to deflect resiliently in the direction of movement of the conveyor belt 1 when engaged by eggs moving thereon. A back-up plate 92a extends across the belt conveyor 1 downstream of the gap 23 to limit downstream displacement of the arcuate wiper blade 92.

Thus, with this structure, the wiper blade 92 cooperates with the guide plate 86 and the tines 70 to allow eggs to exit one at a time through the gap 23 and onto the transfer ramp 68. Eggs deposited on the horizontal portion of the transfer ramp 68 are advanced toward the sloping portion thereof by the fronts of the cup fingers 54 as they advance through the ramp 68 above the level of the ramp tines 70. See FIGS. 7 and 8. Eggs deposited on the sloping portions 76 of the transfer ramp tines 70 are cradled in the fingers 54 of the egg cups as the fingers 54 advance in interdigitated relation through the tines 70. Eggs thus deposited in the cups 52 advance around the idler pulley 60 and thence vertically downward toward an unloading station adjacent the bottom of the collector C. Preferably, each downward run of conveyor 50, 50a, 50b, and 50c is confined within a wire mesh guard, such as the guard 100 (FIGS. 7 and 9) associated with the conveyor 50.

Figure 5A:
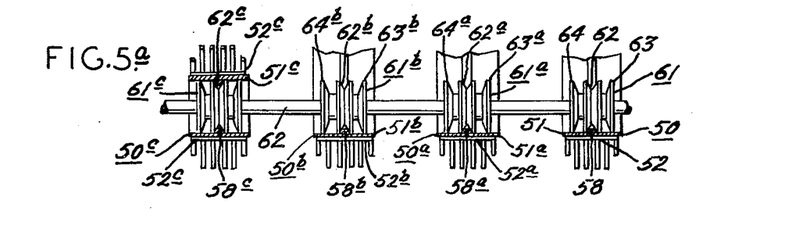
FIG. 5a is a fragmentary sectional view (with certain parts omitted) on line 5a—5a, FIG. 5.

As previously stated, the intermediate conveyors 50 (a), 50(b) and 50(c) are similar in construction and operation to the highest level intermediate conveyor 50 except that they are successively shorter in length so that they operate at respectively lower levels in cooperative association with the cage belt conveyors 1(a), 1(b) and 1(c) respectively. Thus, as best seen in FIGS. 5 and 5a, the intermediate conveyor 50(a) associated with the next highest cage conveyor 1(a) travels about an upper pair of horizontally spaced idler pulleys 59(a) and 60(a) and a lower drive pulley 61(a), and the intermediate conveyor 50(b) for the third highest level travels about an upper pair of horizontally spaced idler pulleys 59(b) and 60(b) and a lower drive pulley 61(b). The intermediate conveyor 50(c) for the lowermost level travels about a single idler pulley 59(c) mounted in horizontally spaced relation with respect to drive pulley 61(c). As shown in FIG. 5 of the drawings, the drive pulleys 61, 61(a), 61(b) and 61(c) for the several intermediate conveyors are fixedly mounted on a common shaft 62. The idler pulleys 59, 59(a), 59(b) and 59(c) are disposed in the same vertical plane in the egg collector C, and the idler pulleys 60, 60(a), 60(b) and the drive pulleys 61, 61(a), 61(b) and 61(c) are similarly disposed in another vertical plane in the collector spaced horizontally from the aforementioned vertical plane. The shaft which mounts the idler pulley 59b also mounts similar pulleys 59' (FIG. 5) which engage the belt 50 and 50a at the location where they begin to run vertically upward after leaving their drive pulleys 61 and 61a, respectively. The tension of the various conveyor belts 50–50c can be adjusted by the tensioning assemblies T-Tc connected to the ends of the shafts which mount the idler pulleys 59–59c respectively.

The several intermediate conveyors 50, 50(a), 50(b) and 50(c) are driven at preferably twice the linear speed of the cage belt conveyors 1, 1(a), 1(b) and 1(c). To this end, the conveyor drive shaft 62 (FIG. 5a) mounts a sprocket 63 (FIG. 3) which is rotated by a chain 65 connected to a sprocket 48 on shaft 25(c) which in turn is rotated by the chain 47. For purposes to be described, the chain 65 also drives a sprocket 90 fixed on a shaft 91 by passing under an idler sprocket 92 between the sprocket 63 and the sprocket 48.

Preferably, the pitch diameter of the sprocket 48 is about twice the pitch diameter of the sprocket 63. It has been found, however, that the collector functions satisfactorily as long as the speed of the sprocket 63 is ±25% of the speed of the sprocket 48. This speed differential enables the collector C to handle the maximum capacity of the egg conveyor belts.

Means is associated with each intermediate conveyor for the purpose of gently offloading eggs from the cups 52. To this end, a cooperating rotary brush assembly 93 and a chute 94 are provided to transfer the eggs onto a common cross-belt conveyor 95 which functions to deliver the eggs to a station where they are cleaned, graded and packed for shipment.

Referring to FIGS. 4, 5 and 12-14, the chute 94 comprises a plurality of parallel tines 96 spaced apart so as to interdigitate with the fingers 54 of the egg cups 52 as they advance around the lower drive sheaves or pulleys 61–61c. The tines 96 are curved upwardly and are mounted at their lower ends to a cross member 17 extending horizontally between a pair of depending brackets 18 and 19 underneath the collector frame. Preferably, the tines 96 are coated in a manner similar to the tines 70 of the transfer ramp assembly 68. The eggs received on the chute tines 96 are prevented from rolling laterally off by end guards 96'.

For the purpose of preventing the eggs from rolling freely down the chute 94 and gathering momentum the rotary brush means 93 is mounted outwardly adjacent the lower end of the vertically downward runs of the intermediate conveyors 50–50c and is driven at a predetermined speed. As best seen in FIGS. 4, 5 and 12–14, the rotary brush means 93 comprises a series of four elongated cylindrical hub members 97 mounted on the shaft 91 in axially spaced relation. Each hub member 97 mounts a plurality of longitudinally extending rows 98 of spaced groups of relatively soft yet stiff bristles 99 preferably of nylon. The rows 98 of bristles 99 project radially outward from each hub 97 and are equally spaced circumferentially about the hub 97 at an angle of about 36°. The bristles have a predetermined radial length selected to cooperate with the fingers 54 of the egg cups 52 so as to gently engage the eggs as they are discharged from the cup 52 by the interdigitation therewith of the chute tines 96 as the cups 57 travel around the drive pulleys 61–61c. The brisle rows 98 function to separate and maintain the eggs under positive control so that they are not capable of rolling freely and gathering momentum as they move down the chute 94 and onto the cross belt conveyor 95. The speed of the brush means 93 is determined by the rotational speed of the shaft 91 which is rotated by the motor 35 via the chain 65 and sprocket 90 as noted heretofore; however, the brush 93 rotates in the direction opposite the rotation of the cups 52 about the pulleys 61–61c. Preferably, the rotational speeds are the same for the brush assembly 93 and drive pulleys 61–61c.

In operation, an attendant at the central processing station activates the power supply (not shown) for the cross belt 95. Thereafter, he activates the motor 35 of the collector C to cause eggs deposited on the various belt runs 1–1(c) to advance toward the collector C. The eggs enter the collector C as described heretofore and are simultaneously loaded onto the various intermediate conveyors 50–50(c). The eggs are thus lowered into the offloading zone where the rotary brush assembly 93 cooperates with the chutes 94 to gently load the eggs onto the cross belt 95.

In view of the foregoing, it should be apparent that the present invention provides an improved egg collector which functions with a minimum of moving parts to transfer eggs gently from a series of cage conveyor belts and to a common cross belt. The egg collector has a large number of common parts which can be manufactured economically by high-speed mass production techniques. Moreover, because of the simplicity of the design of the egg collector, it is highly dependable in operation and functions with a minimum of maintenance.

Although the collector illustrated in and described herein is specifically designed for use in a four level cage system, it should be apparent that it may be readily modified to function satisfactorily in connection with single, double or triple level cage systems, simply by omitting the longer intermediate conveyor runs and appropriately modifying the size of the framework. Thus, while a preferred embodiment of the present invention has been described in detail, various modifications, alterations and changes may be made without departing from the spirit and scope of the present invention as defined in the appended claims.

I claim:

1. In an automated egg production system, including at least one row of cages adapted to confine egg-laying hens, an endless elongated cage conveyor belt disposed relative to the cages to receive eggs laid by the hens and to convey the eggs toward one end of the cage row, and collector means at said end of the cage row for transferring the eggs from the cage conveyor belt to another conveyor, the improvement wherein said collector means comprises:

a frame at said one end of the cage row;
means on said frame for guiding and moving said cage conveyor belt in a substantially horizontal path through a lateral offloading station in said frame;
wiper means adapted to engage eggs on said moving conveyor belt and displace said eggs laterally from the conveyor belt;
an egg transfer ramp assembly mounted closely adjacent said cage conveyor belt at said offloading station for receiving eggs displaced laterally therefrom by said wiper means, said ramp assembly including a plurality of elongated spaced parallel tines having downwardly sloping end portions;
an endless intermediate belt conveyor having a plurality of egg receiving cups secured in spaced relation longitudinally therealong;
means mounting said intermediate conveyor for movement through a horizontal path laterally subjacent said cage conveyor belt and underneath said transfer ramp and thence downwardly to a lower egg discharge station;
each of said egg cups of the intermediate conveyor comprising a plurality of outwardly projecting fingers disposed in an arcuate concave arrangement facing opposite the direction of travel of said intermediate conveyor;
said cup fingers and said tines of the transfer ramp being relatively spaced and disposed for interdigitating movement of the said cup fingers between and relative to said tines, whereby the eggs received on the transfer ramp are deposited individually and successively in the cups of said intermediate conveyor;
and means at said lower discharge station of the intermediate conveyor operable to change the direction of movement of said intermediate belt conveyor to cause the egg cups successively to be tilted downwardly at an angle sufficient to discharge the eggs therefrom.

2. Apparatus for offloading eggs from a conveyor belt, comprising:
an intermediate conveyor belt assembly;
means mounting said intermediate belt assembly for longitudinal movement in a run alongside said conveyor belt at a closely adjacent lower level;
said intermediate belt assembly including:
a web of belting,
a series of cups carried at spaced intervals on the topside of said belting, each cup having a series of separated fingers outstanding from the belting and arranged to form an egg receiving cavity;

a transfer ramp assembly overlying said intermediate belt run for depositing eggs in said cups as said cups advance;

said transfer ramp assembly comprising an array of elongated tines arranged to provide a trough sloping downwardly from a location adjacent the level of said egg conveyor belt and toward the level of said intermediate belt assembly, said tines terminating adjacent the topside of said intermediate conveyor belting and being arranged relative to said cup fingers to interdigitate therewith as the cups advance to deposit eggs in the cups; and means for displacing eggs one by one from said egg conveyor belt and onto said transfer ramp assembly.

3. Apparatus according to claim 2 wherein each of said cups includes:

a base engaging the topside of said belting, lug means extending from said base through said belting, and fastening means on said lug means engaging the underside of said belting to fasten said cup to said belting, said series of fingers extending away from said base in a direction opposite said lug means to provide an egg-cradling concavity on the topside of said belting.

4. A transfer belt assembly according to claim 3 wherein said cups are of molded thermoplastic material and said fastening means includes a heat-deformed head on said lug means.

5. A transfer belt assembly according to claim 4 including an elongated Vee-type belt fastened to the underside of said belting at about the longitudinal median thereof, and wherein said lug means includes a pair of lugs extending through the belting on opposite sides of said Vee-belt.

6. Apparatus for transferring eggs from at least two egg collection conveyor belts arranged at vertically-spaced and horizontally-offset levels to a common unloading station below the lowermost one of said levels, said apparatus comprising:

a frame;

channel means in said frame at said levels for supporting and guiding said belts for linear motion relative to said frame;

means providing a lateral gate in each of said channel means to afford lateral offloading of eggs from the conveyor belts;

wiper means disposed in each of said channel means adjacent said gate for resiliently engaging eggs on the belt as it advances forwardly and displacing the eggs laterally through the gate;

means providing a transfer ramp extending alongside and below each gate, said transfer ramp including a series of elongated tines disposed in spaced relation and shaped to provide an elongated concave trough having portions sloping downwardly away from the level of said conveyor belt;

an intermediate conveyor belt assembly mounted in said frame for movement in a linear run parallel to said conveyor belt and underneath each transfer ramp, said intermediate conveyor including: a web of belting, and a series of rearwardly-concave cups carried at spaced intervals by said belting, each of said cups having a series of separated fingers adapted to interdigitate with said transfer ramp tines as said intermediate belt advances beneath said transfer ramp;

a pair of rollers engaging the underside of each intermediate conveyor belt at spaced locations upstream and downstream of said transfer ramp to support said intermediate belt underneath said transfer ramp;

tilting means engaging the underside of each intermediate belt assembly adjacent said unloading station to tilt the cups successively for offloading the eggs carried in the cups;

chute means mounted by said frame to at least partially underlie the path of movement of said cups around said tilting means and to interdigitate with said cup fingers to receive eggs offloaded therefrom by the aforesaid tilting action;

rotary brush means mounted in said frame adjacent said chute and tilting means and having bristles for engaging said cups as they advance around said tilting means to cooperate therewith and with said chute means to positively control offloading of eggs from said cups; and drive means mounted in said frame for rotating said brush means and advancing said egg conveyor belt and said intermediate belt assembly in the same directions.

7. Apparatus according to claim 6 including shaft means in said frame mounting said intermediate conveyor belt rollers in horizontally-spaced parallel vertical planes transverse to the paths of movement of the egg collection belts to cause the intermediate conveyor belts to have parallel upwardly and downwardly disposed runs, one of said shaft means including a common drive shaft mounted adjacent the bottom of said frame, pulley means mounted on said common drive shaft with said intermediate belts all trained therearound to provide said cup tilting action, and means connecting said common shaft to said drive means for causing said common drive shaft to rotate and hence to drive all of said intermediate conveyor belts.

8. Apparatus according to claim 6 wherein the drive means for each of said egg conveyor belts includes a pair of rolls mounted in the frame downstream of said transfer ramp assembly, and including removable receptacle means mounted in said frame adjacent said rolls for receiving waste carried by said egg conveyor belt into said frame.

9. Apparatus according to claim 6 wherein said drive means for each intermediate conveyor and said egg belt conveyor causes the intermediate conveyor to advance at a linear velocity about twice the linear velocity of its associated egg belt conveyor.

10. Apparatus according to claim 6 wherein said transfer ramp has a substantially horizontal portion disposed alongside said lateral gate at a predetermined level with respect to the intermediate conveyor belt as to cause the cup fingers to advance through the ramp tines at a slightly higher level than the ramp level for engaging eggs on the horizontal portion of the transfer ramp and advancing them toward the sloping portion thereof for deposit in the cups.

11. Apparatus according to claim 6 including a resilient deflector plate disposed vertically above the transfer ramp assembly at about its longitudinal median and in spaced relation with said gate for cooperating with the wiper means to cause eggs to be loaded one at a time on the transfer ramp assembly.

* * * * *